United States Patent
Tenn

Patent Number: 5,112,216
Date of Patent: May 12, 1992

[54] PULP MILL GAS COMBUSTION PROCESS

[75] Inventor: Trevor I. Tenn, North Vancouver, Canada

[73] Assignee: Chemetics International Company Inc., North York, Canada

[21] Appl. No.: 414,403

[22] Filed: Sep. 29, 1989

[30] Foreign Application Priority Data

Dec. 22, 1988 [CA] Canada ................................. 586928

[51] Int. Cl.⁵ ............................................. F23D 14/00
[52] U.S. Cl. ............................................. 431/5; 431/2; 431/160; 110/237; 110/341; 110/345
[58] Field of Search .......... 431/160, 159, 2, 5, 431/4; 165/142, 154, 168, 178; 138/38, 114; 110/237, 246, 341, 345; 239/128, 132, 132.1, 132.3

[56] References Cited

U.S. PATENT DOCUMENTS

| | | | |
|---|---|---|---|
| 3,297,411 | 1/1967 | Dear | 431/160 X |
| 3,638,932 | 1/1972 | Masella et al. | 239/132.3 |
| 3,722,814 | 3/1973 | Miyashita | 239/132.3 X |
| 4,369,803 | 1/1983 | Furr | 137/88 |
| 4,919,331 | 4/1990 | Kosik, Sr. et al. | 239/132.1 X |

*Primary Examiner*—Larry Jones
*Attorney, Agent, or Firm*—Charles Brian Barlow

[57] ABSTRACT

A process and apparatus for the combustion in an incineration device of noxious noncondensable gases produced in a pulp mill comprising the use of a novel injection nozzle, said nozzle comprising a tubular conduit means, an insulating inner jacket surrounding said conduit means, and an outer cooling jacket surrounding said inner jacket. Increased nozzle life is obtained.

3 Claims, 1 Drawing Sheet

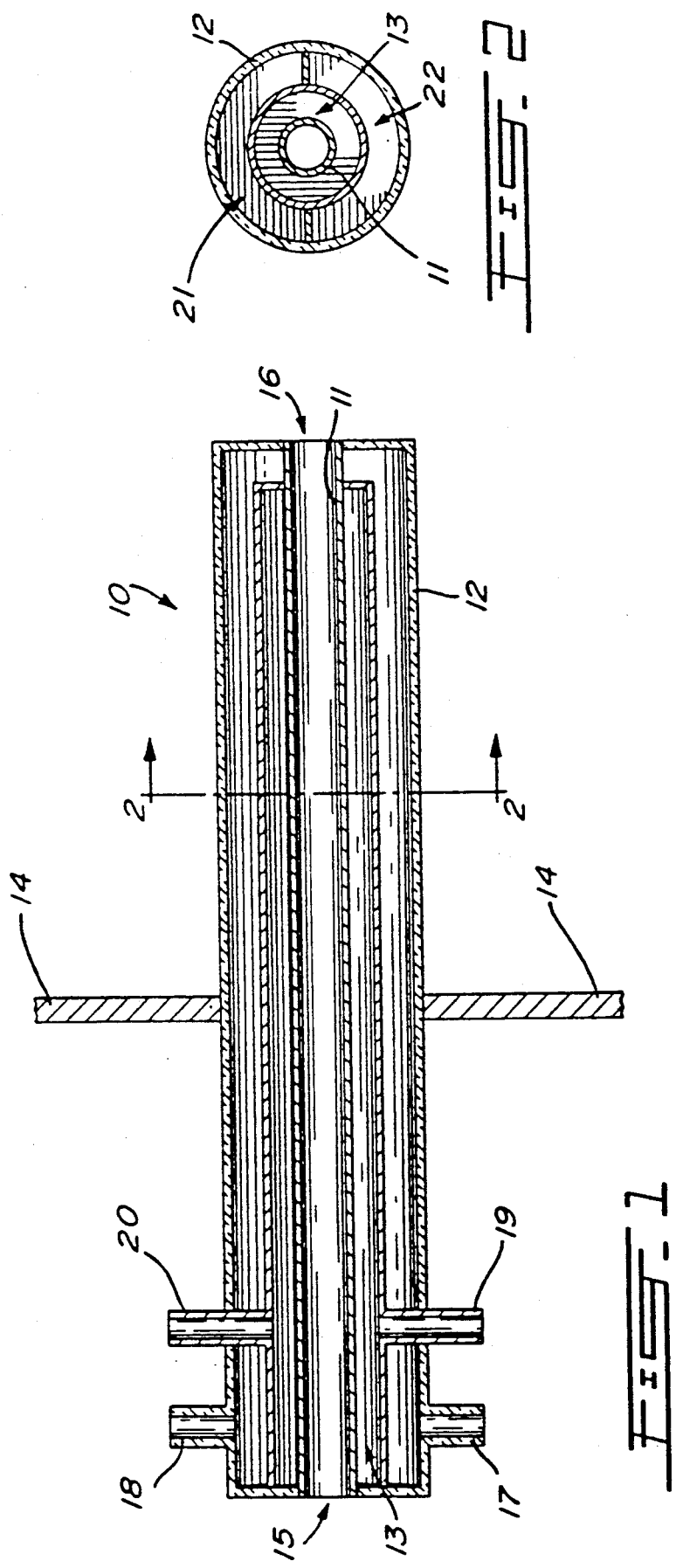

PULP MILL GAS COMBUSTION PROCESS

FIELD OF THE INVENTION

This invention relates to a process and apparatus for the thermal oxidation of gases generated in a kraft pulp mill and more particularly to an injection nozzle for use in said process.

BACKGROUND OF THE INVENTION

The kraft pulping of lignocellulosic materials leads inevitably to the formation of significant quantities of foul gases due to the reaction of sulfide-containing chemicals used in the kraft process with components in the lignocellulosic material. Collectively, these gases result in the foul smell associated with kraft pulp mills.

In addition to the unpleasant smell, the foul gases pose special problems because they are highly toxic, very corrosive, and explosive when mixed with air. These gases generally include hydrogen sulfide, methyl mercaptan, dimethyl sulfide, and dimethyl disulfide and are known as Total Reduced Sulfur (TRS) gases. Other noxious components of the foul gases include turpentine vapour and methanol. These foul gases are referred to collectively as noncondensable gases (NCG) since they cannot in general be condensed by common pulp mill vapour-cooling devices.

The chief sources of NCG emissions are well-known in the kraft pulping industry. Excluding the recovery boiler, a typical kraft mill has significant NCG discharges from many points including but not limited to the digester-blow and digester-relief areas, the multiple-effect evaporators, tall oil plant and filtrate tanks. The preferred treatment of these gases is by combustion of the gases in an incineration device. The lime kiln, typically used in the kraft process, is often preferred for combustion since it satisfies the thermal requirements for oxidation of sulfur gases and may allow sulfur recovery. However, other incineration devices are also suitable. These incineration devices include, but are not limited to, recovery boilers, power boilers and independent combustion furnaces as well as the lime kiln.

Other gases may be advantageously incinerated in a manner similar to the NCG stream. These include stripper gases derived from the air or steam stripping of evaporator condensates from the recovery system in the pulping process. Stripper vapours may include methanol, turpentines and other noncondensable gases.

In addition to the kraft process, the collection and incineration of noxious gases is also practiced in the Neutral Sulphite Semi-Chemical (NSSC) pulping process. In cases where both processes are carried out at the same mill site there is the potential for consolidating the NCG streams.

The major consideration in the design of systems to collect and burn the NCG is the explosive nature of the components. TRS gases are potentially explosive when mixed with air over the range of 2 to 50%. Turpentine is explosive at 1% and methanol at 7%. Furthermore, the flame propagation speed of TRS and methanol gases is about 0.5 m/s while that of turpentine is in the range of 150 m/s. Thus, special care must be taken in designing the system that collects, carries and incinerates these dangerous gases.

In conventional practice the NCG from the various sources are collected in a common pipe, and fans are used to blow the gas to the incineration device. This system has several problems, the most serious of which is the potential for fires and explosions should the fans produce an ignition source through sparks or hot spots. Other problems include corrosion of the fans by the gas, failure of fan seals, and resinous deposits on fans and other system components.

Recently, a system has been developed that uses steam ejectors as motivators to propel the gas directly to the incineration device obviating the problems associated with fans. Using steam for motivation eliminates the problems of sparks and hot spots, corrosion, and leaking seals. Furthermore, the steam can be introduced at a velocity above the flame propagation speed of the NCG stream regardless of the noncondensable gas flow rate.

Unfortunately, the use of steam ejectors has introduced a problem with regard to the incineration arrangement. The collected gas is normally directed through an injection nozzle into an incineration device such as the lime kiln. The extreme heat, often as high as 1200° C. at the portion of the nozzle inside the kiln would result in rapid wear and failure of the nozzle were there not a system for cooling the nozzle during operation. In the fan-based NCG collection systems one known method to effect cooling is by using a water jacket surrounding the injection nozzle. However, attempts to adapt this efficient cooling system to the new safer systems designed with steam ejectors have been unsuccessful.

The application of the water jacket cooling system to the injection nozzle in the steam-based system results in the condensation of the steam that was used to motivate the NCG through the system. The water which collects in the cooled injection nozzle will drip into the kiln thus interfering with the kiln's smooth operation and even causing gaseous disruptions as the water droplets suddenly vaporize once again in the high heat of the kiln. The injection nozzle must therefore be cooled sufficiently to prevent nozzle failure yet its temperature must be elevated sufficiently to prevent the condensation of the steam entrained in the NCG stream.

One partial solution to the nozzle problem has been to insert a steam condenser in the steam-based NCG collection system in an attempt to recover heat from the steam/NCG stream. This condenser also removes a substantial portion of the motivating steam ahead of the cooled injection nozzle. In practice, this partial solution has been costly owing to the need for an additional condenser. Furthermore, efficient removal of steam also condenses some of the typically non-condensable gas components giving rise to a new effluent problem. Alternatively, partial prior condensation of the steam might leave the NCG stream intact, but the nozzle condensation problem would still be present. Most importantly, the gas velocity, after the steam has been removed, can fall to an unsafe level.

A second solution to the nozzle problem has been to install a combination of air and steam cooling in place of water cooling. This system suffers from disadvantages in that it is costly owing to the need for the additional fans and piping required as well as the need for sophisticated control and standby devices. Furthermore, the air and steam mixture is a relatively poor cooling media so that the nozzle must be constructed of expensive steel that can withstand the high temperatures found at the kiln exposed nozzle tip.

Thus, it can be seen that a serious problem exists in the art in the collection and combustion of noncondensable gases generated in a pulp mill.

SUMMARY OF THE INVENTION

Surprisingly, it has now been discovered that a novel design of a cooled injection nozzle having a cooling jacket through which a cooling fluid is circulated and additionally having an insulating layer separating the cooling jacket from the outer surface of the inner NCG gas conduit allows the problems of the prior art to be overcome.

It is an object of the present invention to provide a process for the combustion of noncondensable gases in an incineration device that is particularly amenable to NCG streams containing substantial quantities of steam. A further object of the invention is to provide a process having simple control of the cooling media flow in order to facilitate safe and reliable operation of the device. A still further object of the invention is to provide a process that permits the use of less expensive grades of steel in the construction of the nozzles while maintaining the advantages of steam ejectors in NCG collection systems.

Accordingly, the invention provides a process for the combustion in an incineration device of noncondensable gases produced in a pulp mill, said process comprising (a) mixing said gases with steam to produce a gaseous steam mixture, (b) feeding said mixture to said incineration device through an injection nozzle, said nozzle comprising:

i) a first portion defining an outer surface disposed within said incineration device;

ii) conduit means through which said gaseous steam mixture passes to said incineration device;

iii) thermal insulating means surrounding said conduit means to substantially prevent condensation of said steam; and iv) cooling means receiving a cooling fluid to effect cooling of said outer surface of said nozzle, and (c) burning said mixture in said incineration device.

In a preferred embodiment the invention provides a process as hereinabove described wherein said steam motivates said gas.

In a further preferred embodiment, the invention provides a process as hereinbefore described wherein said cooling fluid is water.

In an additional aspect, the invention provides an apparatus for the combustion in an incineration device of noncondensable gases produced in a pulp mill comprising (a) means for feeding a gaseous steam mixture to a nozzle, said nozzle comprising:

i) a first portion defining an outer surface adapted to be disposed within an incineration device;

ii) conduit means through which said gaseous steam mixture passes to said incineration device;

iii) thermal insulating means surrounding said conduit means to substantially prevent condensation of said steam; and iv) cooling means adapted to receive a cooling fluid to effect cooling of said outer surface of said nozzle, and (b) an incineration device.

In a preferred embodiment, the invention provides an apparatus as hereinabove described wherein said conduit means is a tubular conduit, said thermal insulating means comprises an inner jacket coaxially surrounding said tubular conduit, and said cooling means comprises an outer jacket coaxially surrounding said inner jacket and provided with a cooling fluid inlet and outlet.

In a further additional aspect, the invention provides an injection nozzle having:

i) a first portion defining an outer surface adapted to be disposed with an incineration device;

ii) conduit means through which a gaseous steam mixture passes to said incineration device;

iii) thermal insulating means surrounding said conduit means to substantially prevent condensation of said steam; and iv) cooling means adapted to receive a cooling fluid to effect cooling of said outer surface of said nozzle.

BRIEF DESCRIPTION OF THE DRAWINGS

In order that the invention may be better understood, a preferred embodiment according to the invention will now be described, by way of example only, with reference to the accompanying drawings wherein:

FIG. 1 is a vertical cross-sectional view of a nozzle according to the present invention; and FIG. 2 is a vertical cross-section view of the nozzle shown in FIG. 1 along the line 2—2 as indicated.

DESCRIPTION OF THE PREFERRED EMBODIMENT

The nozzle 10 in FIG. 1 has a tube 11, having a NCG/steam inlet 15 and outlet 16, surrounded by a cooling jacket 12. Between the tube 11 and the jacket 12 is a thermally insulating plenum 13 that extends essentially along the length of the tube 11. The nozzle 10 extends through the wall of a lime kiln 14 so that nozzle outlet 16 is disposed within said kiln 14. Cooling jacket 12 has a cooling fluid inlet 17 and outlet 18 located near inlet 15 outside of the kiln 14. Plenum 13 has an air inlet 19 and outlet 20 also located near inlet 15 and outside of the kiln 14.

In operation a mixture of NCG and steam at a temperature of 120° C. is fed to nozzle inlet 15 and passes through tube 11. The mixture exits via tube outlet 16 at a temperature of 120° C. which temperature substantially prevents steam from condensing in the tube. Nozzle 10 extends into kiln 14 to a sufficient depth to ensure combustion of the NCG. In order to protect the nozzle from failure caused by the extreme heat of 1150° C. in the kiln, cooling water at 10° C. is fed to cooling jacket inlet 17. The water passes through jacket 12 and exits via water jacket outlet 18 at 60° C.

Cooling jacket 12 is thermally separated from tube 11 by air filled plenum 13. Although not required, air can be circulated through plenum 13 via air inlet 19 and outlet 20. Alternatively, air inlet 19 and outlet 20 can be capped to provide stationary air insulation.

In FIG. 2, it can be seen that plenum 13 completely surrounds tube 11 and is itself surrounded by cooling jacket 12. Cooling jacket 12 is divided into an upper compartment 21 and a lower compartment 22.

In operation, cooling water travels from cooling fluid inlet 17 along the length of the nozzle assembly in the lower cooling jacket compartment 22 before passing to the upper cooling jacket compartment 23. The cooling water then travels back along the length of the nozzle assembly in upper cooling jacket compartment 23 before exiting via cooling fluid outlet 18.

This embodiment allows direct cooling of the tube 11 only near the tube exit 16, thus substantially eliminating the area of potential steam-condensing surface of tube 11, while cooling and protecting the outer surface of the nozzle 10 from the high temperatures of the kiln.

In general, the dimensions of the injection nozzle will be dictated by design considerations which include volume of NCG, NCG composition, type of incinerator, etc. A typical lime kiln nozzle would have an inner tube through which the steam motivated NCG stream passes with a diameter of between 4 and 8 inches. The insulating gap typically would be between ¼ and 1 inch and the cooling jacket would have a thickness of about 1 inch. The overall length of the tube assembly would typically be 6 to 10 feet in the case of a NCG injection nozzle for lime kiln applications.

The degree of outer surface cooling can be controlled by adjustment of the flow rate of the cooling water in accordance with the temperature of the water. The water feed would preferably be low pressure.

Alternative insulating materials with different heat insulating capacities could be used in place of air circulation in the plenum. For example, a vacuum could be incorporated in the plenum as the thermal insulator. Solid insulators such as fiberglass could also be used. A continuous flow of steam would be suitable as well.

It will be clear to one skilled in the art that modifications in dimensions, insulating materials and cooling media may be made to the apparatus within the scope of the present invention. Numerous variations of such details can be employed while still achieving the benefits of the invention.

The embodiments of the invention in which an exclusive property or privilege is claimed are defined as follows:

1. A process for the combustion of non-condensable gases produced in a pulp mill in an incineration device said gases comprising total reduced sulfur gases and explosive gases, which have toxic and auto-ignition properties, said device having an injection nozzle comprising a conduit and a portion defining an outer surface disposed within said incineration device said process comprising
   (a) mixing said gases with steam to produce a gaseous steam mixture,
   (b) passing said gaseous steam mixture through said conduit to said incineration device;
   (c) passing an air stream around said conduit to thermally insulate said conduit to substantially prevent condensation of said steam;
   (d) passing a cooling fluid to said nozzle to effect cooling of said outer surface of said nozzle; and
   (e) burning said mixture in said incineration device.

2. A process as claimed in claim 1 wherein said steam motivates said gas.

3. A process as claimed in claim 1 wherein said cooling fluid is water.

* * * * *